(12) United States Patent
Demia et al.

(10) Patent No.: US 6,619,116 B1
(45) Date of Patent: Sep. 16, 2003

(54) VOLUMETRIC LIQUID METER HAVING A PART OF THE CHAMBER FORMED WITH MULTI-MATERIALS

(75) Inventors: Laurent Demia, Macon (FR); Michel Petite, Macon (FR)

(73) Assignee: Actaris S.A.S., Montrouge (FR)

( * ) Notice: Subject to any disclaimer, the term of this patent is extended or adjusted under 35 U.S.C. 154(b) by 0 days.

(21) Appl. No.: 10/132,160

(22) Filed: Apr. 26, 2002

(30) Foreign Application Priority Data

Apr. 26, 2002 (FR) ............................................. 01 05844

(51) Int. Cl.$^7$ ................................................ G01F 3/08
(52) U.S. Cl. ....................................................... 73/253
(58) Field of Search .......................... 73/236, 237, 239, 73/253, 252, 255

(56) References Cited

U.S. PATENT DOCUMENTS

| 3,947,177 | A | * | 3/1976 | Eckardt | ...................... 425/130 |
| 4,104,353 | A | * | 8/1978 | Monnet | ...................... 264/255 |
| 6,475,413 | B1 | * | 11/2002 | Siano | ...................... 264/40.1 |

FOREIGN PATENT DOCUMENTS

| FR | 2 719 663 | 11/1995 |
| FR | 2 763 014 | 11/1998 |

* cited by examiner

*Primary Examiner*—Harshad Patel
(74) *Attorney, Agent, or Firm*—Sughrue Mion, PLLC

(57) ABSTRACT

A volumetric liquid meter of the oscillating piston type having a chamber, includes a bottom portion, a fixed partition, a piston and a filter. At least one element forming the chamber is formed by at least two materials presenting different mechanical characteristics and is made by a multi-material injection method.

11 Claims, 6 Drawing Sheets

VOLUMETRIC LIQUID METER HAVING A PART OF THE CHAMBER FORMED WITH MULTI-MATERIALS

The invention relates to a method of manufacturing a volumetric liquid meter of the oscillating piston type, and also to a volumetric liquid meter manufactured by the manufacturing method of the invention. Such a meter comprises a cylindrical measuring chamber made up of various elements: a bottom portion comprising a side wall and a bottom wall having an inlet port, a top portion that engages thereon comprising a cover having an outlet port, a fixed partition placed between the bottom portion and the top portion, a cylindrical piston placed eccentrically and guided to move inside the chamber by means of the partition occupying a slot of said piston, a filter engaged on said chamber to filter the liquid penetrating via the inlet port, and a sealing gasket for forcing the liquid flow to pass through the measuring chamber while preventing any liquid from flowing directly from an admission fitting of the meter to an exhaust fitting thereof. In general, the method of manufacturing said elements consists in injection molding, using respective molds of shapes that match those of the elements to be made.

BACKGROUND OF THE INVENTION

In this type of meter, the measuring chamber as shown in FIGS. 1A and 1B is the essential element on which the accuracy of flow rate measurement depends. The measuring vessel is a chamber 30 of cylindrical shape comprising a bottom wall 1, a side wall 2, and a cover 3. The bottom wall 1 and the cover 3 have respective bottom and top cylinders 4 and 5, both of the same diameter, which diameter is smaller than the diameter of the chamber. The two cylinders 4 and 5 are centered on the axis of the chamber. The center of the bottom cylinder has a metal rod 28 on which a roller 6 is engaged. The bottom wall and the cover are provided at least with an inlet port 7 and an outlet port 8 respectively for admitting and for exhausting fluid into and out from the chamber. The chamber 30 also has a stationary partition 9 of rectangular shape separating the inlet port 7 from the outlet port 8. The partition extends radially between the side wall 2 and the bottom and top cylinders 4 and 5, and axially between the bottom wall 1 and the cover 3. The partition 9 is of rectangular shape and has two substantially parallel faces. The partition possesses two main functions, firstly it guides the motion of the piston, and secondly it provides sealing between the inlet and outlet ports. These functions, in particular the function relating to sealing, mean that the partition must be positioned very accurately with very small clearance between the partition and the groove. The bottom wall, the side wall, the cover, and the bottom and top cylinders have a groove 10 in which the partition is received. A piston 11 of cylindrical shape having a diameter smaller than that of the chamber but greater than the diameter of the bottom and top cylinders is positioned eccentrically inside the chamber. At half-height the piston 11 has a plane wall 12 perforated by holes and supporting two studs 13 in its center, one extending towards the bottom wall and the other towards the cover. The wall also has a pear-shaped notch 14 extending radially and positioned eccentrically. The pear-shaped notch opens out via a slot 15 formed over the full height of the piston.

It is also common practice to use a filter 20, as shown in FIG. 2, in association with such a measuring chamber. The filter 20 is cylindrical in shape comprising a bottom wall 19 and a side wall 18. The bottom wall 19 forms a screen for retaining particles of a size larger than the size of the mesh of the screen. The filter 20 is designed to engage on the cylindrical chamber 30, and in particular the screen 19 comes into contact with the bottom wall 1, while the side wall 18 of the filter fits against the side wall 2 of the chamber so that all of the liquid that penetrates through the inlet port 7 initially passes through the filter.

The filter is also provided with a peripheral sealing gasket in the form of a projection. This projection can be an O-ring of semicircular section or a flexible lip. The gasket provides sealing between the measuring vessel and the meter housing (not shown) in which it is disposed, such that the liquid penetrating via the inlet fitting (not shown) of the meter housing can leave via the outlet fitting (not shown) only after penetrating into the measuring vessel.

A flow meter including such a measuring vessel operates on the principle of admitting a given volume of fluid via the inlet port into the piston, which liquid, by communicating its energy to the piston, causes the piston to turn and enables the liquid to be exhausted towards the outlet port. Thus, each revolution of the piston corresponds to a given volume of fluid passing through. The general motion of the piston is oscillating motion, the axis of the piston describing a circle around the axis of the chamber and the slot of the piston sliding along the partition. The motion of the piston in the chamber is guided by the partition engaging in the vertical slot and in the pear-shaped notch, and also by the stud engaging between the roller and the bottom cylinder. The plane wall of the piston, although positioned between the bottom and top cylinders, remains free to move in a plane.

The various elements forming the measuring chamber are made by injection molding, each element being made using a mold of appropriate shape. The injection method used is a conventional method well known to the person skilled in the art. The material used is a thermoplastic.

In order to improve the mechanical characteristics of the various elements, in particular in terms of mechanical strength, coefficient of friction, density, ability to absorb shocks, or indeed leaktightness, it is usual to apply surface treatment to these elements. The particular surface treatment depends on the specific function that the element is to perform. This treatment consists in depositing a surface layer of material, e.g. occupying 100th the thickness of the unmolded element.

It is also known to modify the structure of the element so as to add new functions thereto. Patent No. EP 0 627 614 describes an oscillating piston liquid meter having a partition whose profile is bi-convave. That particular shape serves to optimize the clearance between the piston and the partition so as to reduce the amplitude of shocks. Patent No. WO 93/22631 describes an oscillating-piston water meter in which the surface of the piston wall that comes into contact with the inside surface of the measuring chamber is grooved. The grooving of the piston serves to reduce friction against the wall of the chamber and to reduce the damage generated in the meter by particles entrained in the water.

The methods used for adding new functions or for improving the mechanical characteristics of the various elements constituting the measuring chamber are complicated and lead to methods of manufacturing and assembling the various elements that are complex and expensive.

OBJECT AND SUMMARY OF THE INVENTION

The object of the invention is to propose a simplified method of manufacture which makes it possible to make the various elements directly using an injection molding technique so that they have improved mechanical characteristics adapted to certain functions of the part, without it being necessary to perform surface treatment after unmolding, and without it being necessary to modify the structure of existing elements.

This object is achieved by a method of the invention consisting in making at least one of the elements of the meter whose mechanical characteristics are to be improved by means of an injection molding technique using a mold of a shape that matches that of the element to be made, the method comprising the following steps:

injecting a first material to form at least a portion of a skin of the element; and then injecting at least a second material presenting mechanical characteristics that are different from those of the first material, to form the core of the element.

This two-material or multi-material injection method makes it possible to obtain, directly on unmolding, a meter element presenting mechanical characteristics that are improved and specific to additional functions without any need to subject the element to subsequent treatment. In addition, the core and the skin of the meter element have different mechanical characteristics, each of which can perform a different function.

By way of example, the desired functions are as follows:

improving the mechanical strength of the piston by making the piston with a core that is made of a material that is stronger than the material constituting its skin;

improving the coefficient of friction of the piston, of the bottom portion, or of the top portion, by making said elements with a skin made of a material having good friction characteristics and a core made of a material providing mechanical strength or lightness;

lightening the piston, the bottom portion, or the top portion by making said elements with a skin made of a material of low density and a core made of a material that provides mechanical strength, or vice versa;

improving the passage of foreign bodies present in the liquid passing through the meter without damaging the meter by making the piston, the bottom portion, or the top portion with a core comprising a rigid material and a skin comprising a material having good elastic properties;

reducing the noise generated by the meter by making the piston, the bottom portion, or the top portion with a core made of a rigid material and a skin made of a material presenting good shock-absorbing properties; and integrating the function of sealing the measuring chamber by making a bottom portion or a filter for engaging on the bottom portion that includes an integrated elastomer sealing gasket.

BRIEF DESCRIPTION OF THE DRAWINGS

Other characteristics and advantages of the invention appear in the following detailed and non-limiting description of various embodiments given with reference to the accompanying drawings, in which.

MORE DETAILED DESCRIPTION

Figure 1A:
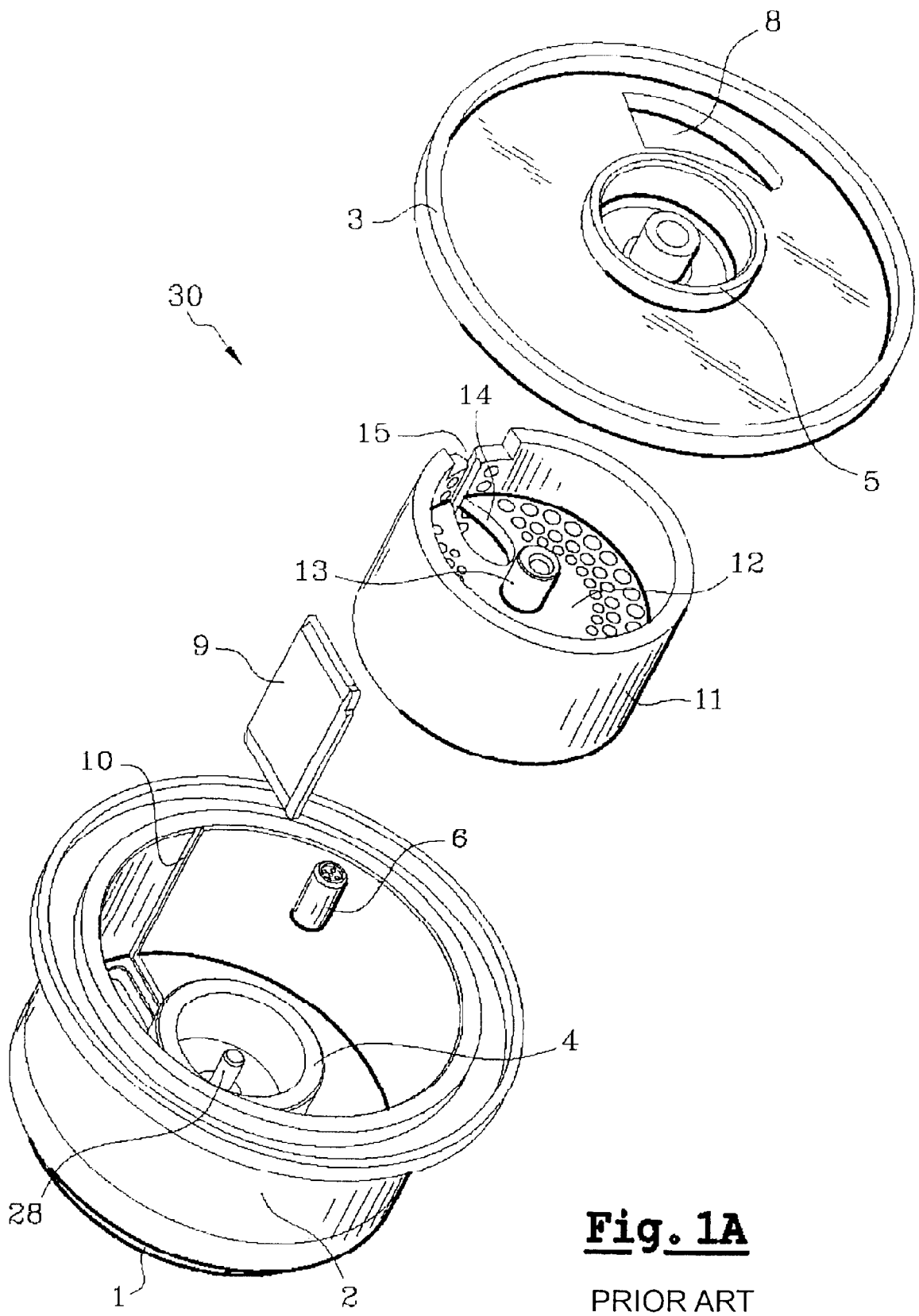
FIGS. 1A and 1B show a conventional measuring chamber for a volumetric fluid meter in an exploded view and in a plan view, respectively.
Figure 1B:
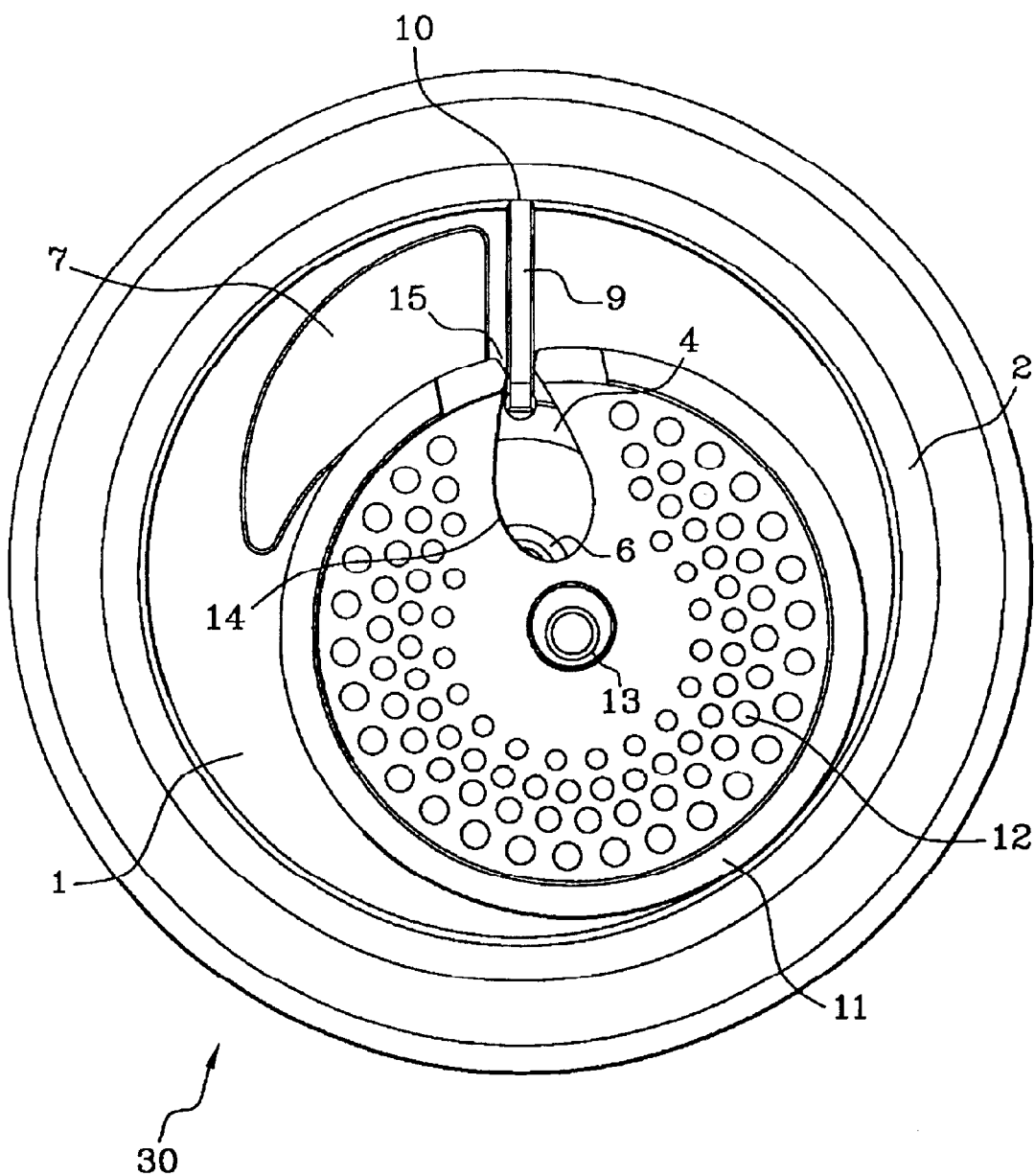
Figure 2:
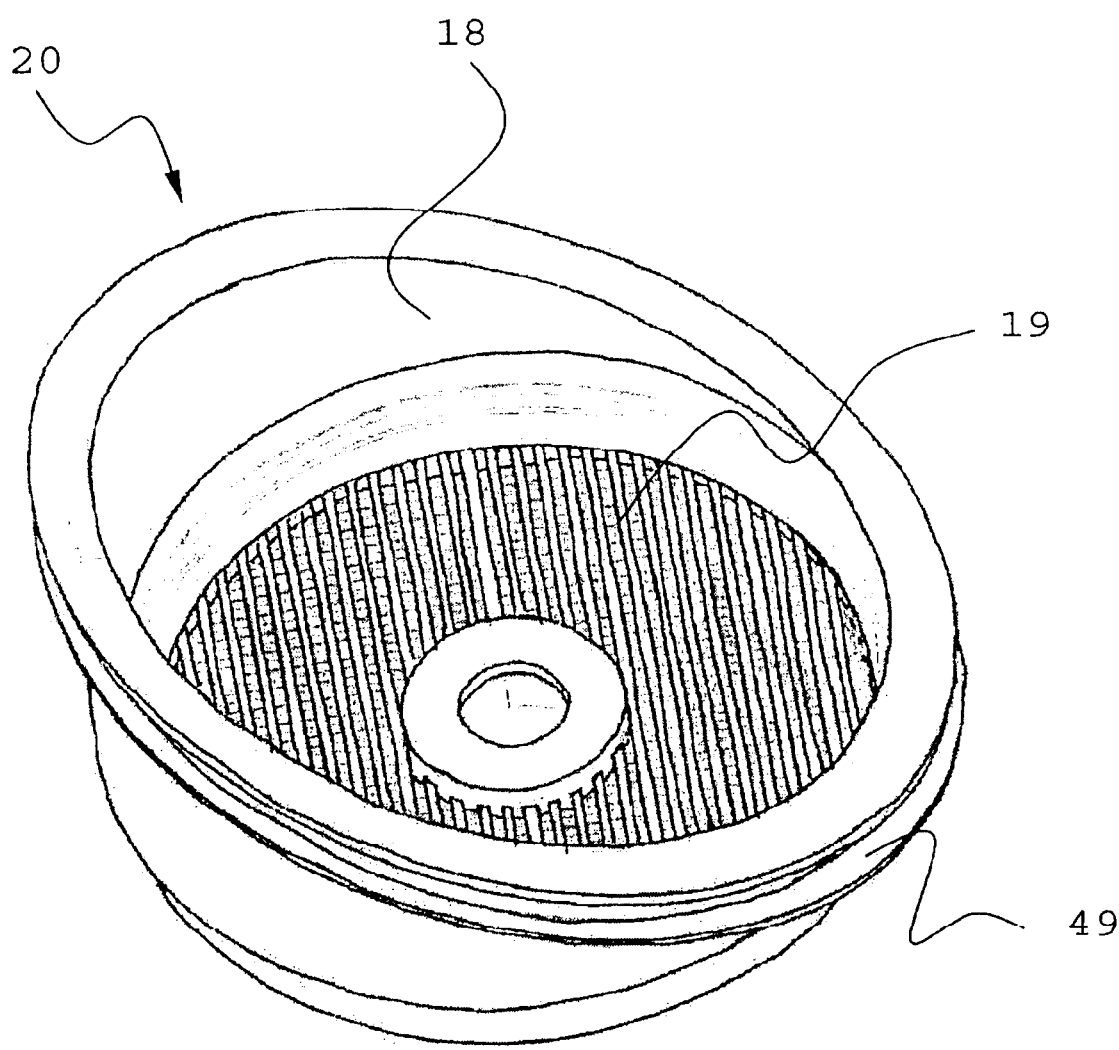
FIG. 2 shows a filter for engaging on the measuring chamber.
Figure 3A:
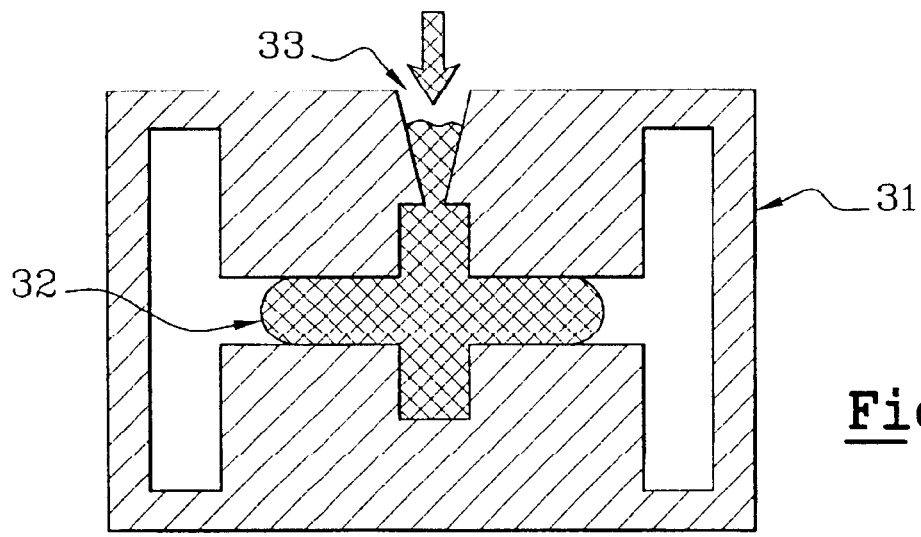
FIGS. 3A, 3B, and 3C show various successive steps in the method of manufacturing a piston in accordance with the invention.
Figure 3B:
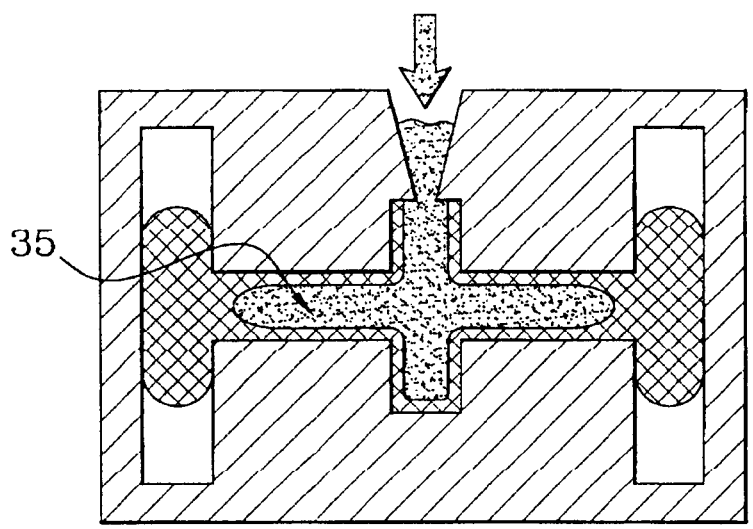
Figure 3C:
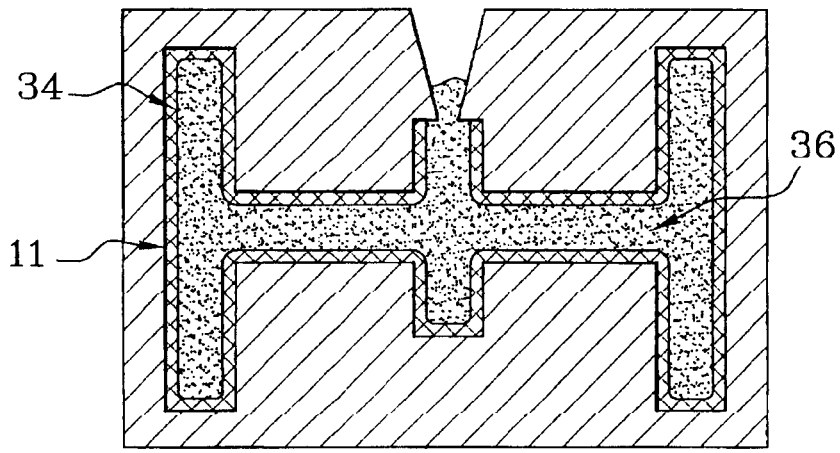

The manufacturing method of the invention is described with reference to a first implementation consisting in making a piston, which method is shown in FIGS. 3A, 3B, and 3C.

The method consists in making the piston 11 by means of a mold 31 of appropriate shape.

A first material 32 is injected into the mold via an opening 33 formed in the body of the mold. The first material serves to form a portion of the skin 34 of the piston.

A second material 35 is injected after the first via the same opening. This second material flows inside the first material and forms the core 36 of the element.

FIG. 3A shows the first material 32 being injected into the cavity of the mold 31, after injection has been in progress for a certain length of time. FIG. 3B shows the second material 35 being injected at a subsequent stage. FIG. 3C shows the final stage when the materials forming the piston 11 have been injected in full.

As an alternative, the piston can be finished by again injecting a small quantity of the first material after injecting the second material. In this way, it is possible to obtain a piston presenting a skin 34 that is continuous and made up solely of the first material.

The injection is performed by injection units whose material flows are grouped together in a common channel.

The injection units enable a plurality of different materials to be injected while guaranteeing good mechanical connection between the materials. Such injection units are well known to the person skilled in the art.

A first variant of the first implementation of the method of the invention serves to make a piston constituted by a plastics material core of high mechanical strength and a skin of a material having a low coefficient of friction.

A piston made in this way presents a small coefficient of friction that enables the performance of a volumetric liquid meter to be improved, in particular its measuring performance with better endurance over time, a starting flow rate that is smaller, and an improved operating temperature range. In addition, the cost of manufacturing such a piston is lower than the cost of manufacturing a prior art piston by a method which includes subjecting the piston to surface treatment during manufacture.

The method of making a piston consists in injecting as the first material, a material having a low coefficient of friction so as to form the skin of the piston, and then in injecting as the second material a plastics material having high mechanical strength to form the core of the piston. By way of example, the first material can be polytetrafluoroethylene (PTFE) or any other fluorine-containing polymer. By way of example the second material can be selected from styrenes such as polystyrene (PS), acrylonitrile butadien styrene (ABS), or styrene acrylonitrile (SAN), polyacrylics such as amorphous polymethyl methacrylate (PMMA), polycarbonates (PC), polysulfones (PSU), polyphenyline oxide (PPO), or polyphenylsulfides (PPS).

The second variant of the first implementation of the method of the invention serves to make a piston comprising a plastics material core and a skin of a plastics material that is stronger than the core material. A piston made in this way presents improved mechanical characteristics, in particular a better operating temperature range, better ability to withstand particles, and better ability to withstand various types of liquid that might pass through the meter.

The method of making such a piston consists in injecting the first material, e.g. a graphite-containing polysulfone, to form the skin of the piston, and then in injecting the second material, e.g. a polyolefin, to form the core of the piston, the first material being stronger than the second material.

The third variant of the first implementation of the method of the invention serves to make a piston constituted by a plastics material core presenting high mechanical strength and a skin of a material presenting low density. A piston made in this way is lighter in weight than a prior art piston while nevertheless retaining good mechanical strength, thus also serving to improve the performance of the volumetric liquid meter. In particular, a piston made using this method presents better resistance to aggressive liquids (carrying particles or that are chemically aggressive) that might pass through the meter, improved measuring accuracy, and a lower starting flow rate. The method of manufacturing such a piston consists in injecting as the first material, a material having low density, e.g. a polyolefin, to form the skin of the piston, and then in injecting, as the second material, a plastics material presenting high mechanical strength, e.g. a material selected from the styrenes or the polyacrylics, so as to form the core of the piston.

The fourth variant of the first implementation of the method of the invention consists in making a piston constituted by a core of rigid material and a skin of elastomer material. A piston made in this way makes it easier for particles conveyed by the liquid to pass through the measuring chamber without damaging it. When a particle penetrates into the chamber, the skin of the piston deforms locally to match the shape of the particle without damaging surfaces or without causing the piston to jam against the surface of the wall of the bottom portion where it contacts the piston.

The method of making such a piston consists in injecting as the first material an elastomer material, e.g. Santoprene as sold by Monsanto, Huytrel as sold by Dupont de Nemours, or ethylene propylene diene monomer (EPDM) sold by Hüls, in the form of skin of the piston, and then to inject as the second material a rigid plastics material to form the core of the piston.

As an alternative (not shown in the figures) for all of the above-described variants, elements made of low density material, e.g. polyolefins, are positioned in the various molds prior to the injection steps. By way of example, these elements can be cylindrical in shape.

For example it is possible to use as polyolefins: polypropylene, TPX, or low or high density polyethylene.

This makes it possible to obtain a piston constituted by a core of plastics material presenting high mechanical strength in which there are embedded elements of material presenting low density.

Figure 4A:
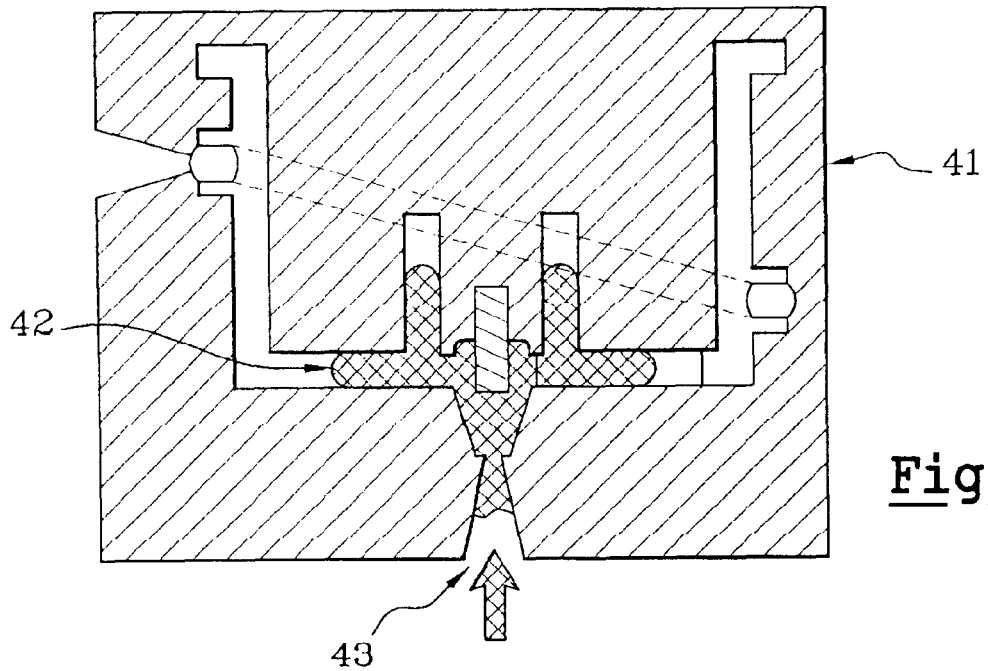
FIGS. 4A and 4B show successive steps in the method of manufacturing a bottom portion of the measuring chamber in accordance with the invention.
Figure 4B:
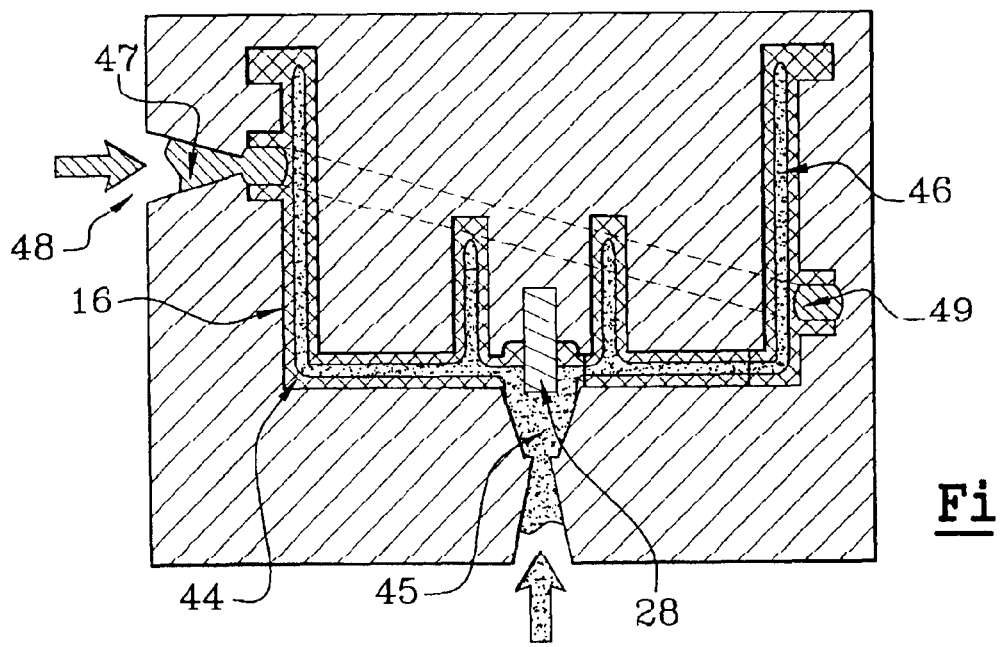

The manufacturing method of the invention is described for a second implementation consisting in making a bottom portion of the measuring chamber. This method is shown in FIGS. 4A and 4B.

A first variant of this second implementation of the method of the invention serves to make a bottom portion that has an integrated sealing gasket in the form of a projection of elastomer material, said gasket being integrated on the outside of the side wall of the bottom portion.

The method consists in making the bottom portion of the measuring chamber by means of a mold 41 of appropriate shape. A stainless steel rod 28 can be positioned initially in a bore formed in the mold.

A first material is injected into the mold via an opening formed through the body of the mold. This first material serves to form the body of the bottom portion. A second material is injected via a second opening so as to form a gasket integrated on the periphery of the bottom portion.

This projection can be in the form of an O-ring of semicircular section or in the form of a flexible lip.

It is also possible to envisage making a bottom portion 16 for the measuring chamber out of three distinct materials, as shown in FIGS. 4A and 4B. FIG. 4A shows the first material being injected into the mold cavity, after injection has been in progress for a certain length of time. FIG. 4B shows the final stage once the second and third materials have been injected in full to form the bottom portion of the measuring chamber. A first material 42 is injected into the mold via an opening 43 formed in the mold body. This first material serves to form a portion of the skin 44 of the bottom portion of the measuring chamber. A second material 45 is injected after the first material through the same opening. This second material flows inside the first material and forms the core 46 of the element. Simultaneously, a third material 47 is injected via a second opening 48 so as to form an integrated gasket 49 on the periphery of the bottom portion.

A second variant of the second implementation of the method of the invention serves to make a bottom portion comprising a core of a plastics material presenting high mechanical strength and a skin, in particular the surfaces of the skin that come into contact with the piston made of a material having a low coefficient of friction.

The method of making such a bottom portion consists in injecting as the first material a material having a low coefficient of friction, e.g. PTFE or some other fluorine-containing polymer, so as to form the skin, and then in injecting as the second material, a plastics material presenting high mechanical strength, e.g. SAN, ABS, or PSU, so as to form the core of said bottom portion.

For this second variant, an alternative that is not shown in the figures enables a filter 20 to be made that comprises a plastics material presenting high mechanical strength and that integrates a sealing gasket 49 in the form of a projection of elastomer material, e.g. a vulcanized thermoplastic rubber (TPV) such as Santoprene, EPDM, or a polychloroprene.

The projection can form an O-ring of semicircular section or a flexible lip.

The filter made in this way is fitted onto the bottom portion of the measuring chamber.

The method consists in making the filter with its integrated sealing gasket by injecting as the first material a plastics material presenting high mechanical strength to form the filter 20, and then in injecting, as the second material, an elastomer material to form the sealing gasket 49.

As an alternative for the variants of the second implementation, the bottom portion can be finished by again injecting a small quantity of the first material at the end of injecting the second material. This serves to obtain a bottom portion presenting a skin that is continuous and that comprises the first material only.

Another alternative for the variants of the second implementation consists in injecting as the first material an elastomer material so as to form the skin in order to enable particles to pass through more easily.

The method of manufacture of the invention is described below in a third implementation consisting in making the top portion, the method being shown in FIGS. 5A, 5B, and 5C.

The method consists in making the top portion 17 of the measuring chamber by means of a mold 51 of appropriate shape.

A first material 52, e.g. PTFE or some other fluorine-containing polymer, is injected into the mold via an opening 53 formed through the mold body. This material has a low coefficient of friction and serves to form at least the surfaces of the skin 54 of the top portion 17 that come into contact with the piston.

A second material 55 which presents high mechanical strength, e.g. PPS, PMMA, or PC, is injected after the first via the same opening 53. This second material flows inside the first material and forms the core 56 of the top portion.

Figure 5A:
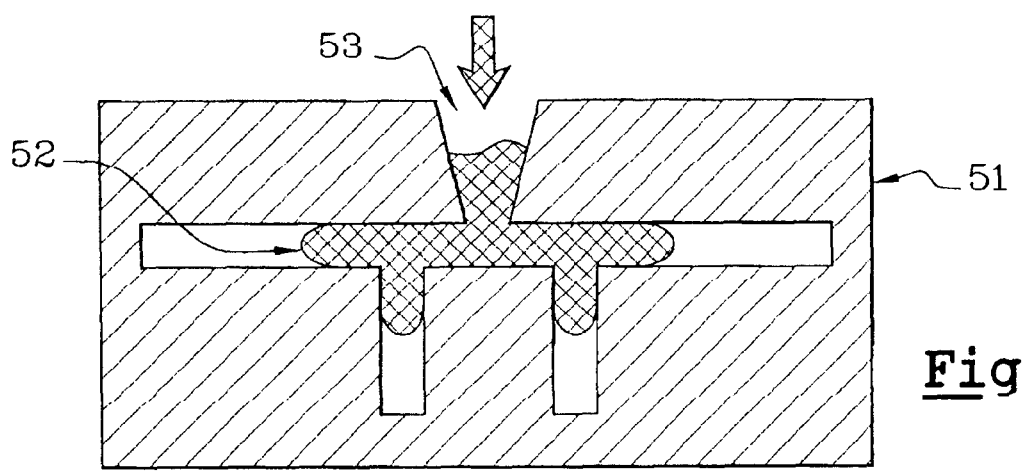
FIGS. 5A, 5B, and 5C show successive steps in the method of manufacturing a top portion of the measuring chamber in accordance with the invention.
Figure 5B:
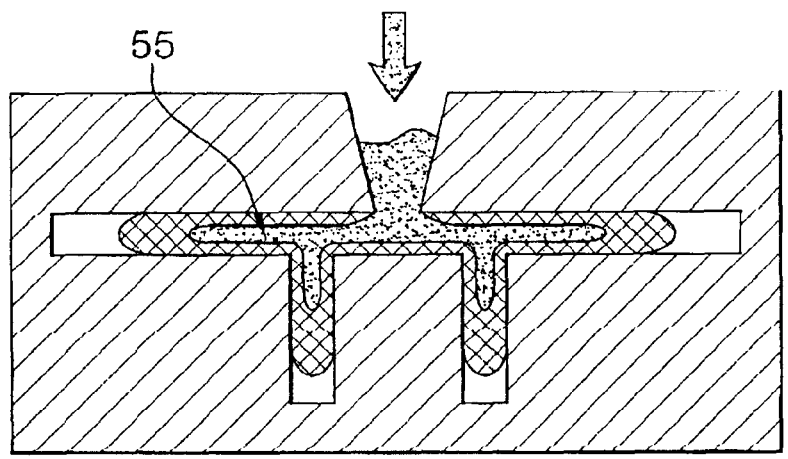
Figure 5C:
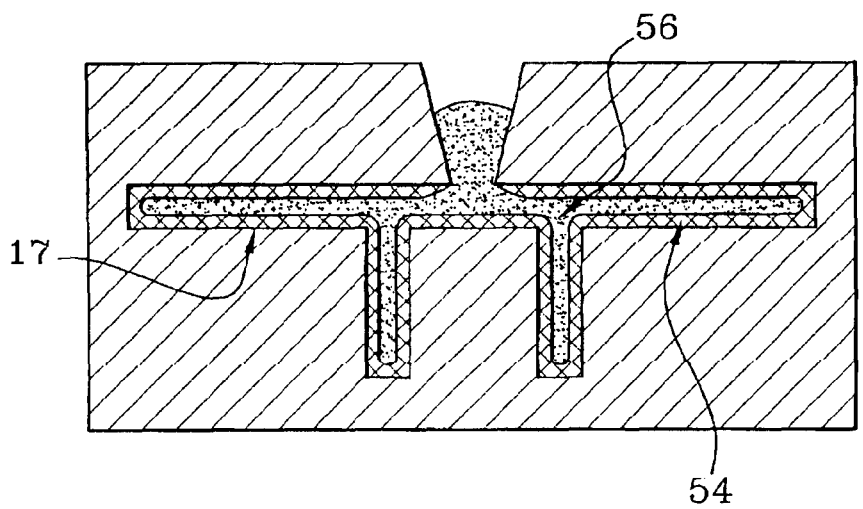

FIG. 5A shows the first material 52 being injected inside the mold cavity 51 after a certain amount of material has been injected. FIG. 5B shows injection of the second material 55 at a subsequent stage. FIG. 5C shows the final stage when the materials forming the top portion have been injected in full.

As an alternative, the top portion can be finished by again injecting a small quantity of the first material 52 after the second material 55 has been injected. This makes it possible to obtain a top portion presenting a skin 54 that is continuous, being made of the first material only.

What is claimed is:

1. A volumetric liquid meter of the oscillating piston type including a cylindrical measuring chamber comprising:

a bottom portion comprising a side wall and a bottom wall provided with an inlet port, onto which there is engaged a top portion comprising a cover having an outlet port, a fixed partition disposed between the bottom and top portions, a cylindrically-shaped piston placed eccentrically and guided to move inside the chamber by means of the partition occupying a slot of said piston, a filter engaged on said chamber for filtering the liquid penetrating into the inlet port, and a sealing gasket for constraining the liquid to flow through the measuring chamber, preventing any direct flow of liquid from an admission fitting to an exhaust fitting of the meter, wherein at least one element forming the chamber is constituted by at least two materials presenting different mechanical characteristics and is made by a multi-material injection method.

2. A volumetric liquid meter according to claim 1, in which the piston is constituted by a core of plastics material presenting high mechanical strength and by a skin of material having a low coefficient of friction.

3. A volumetric liquid meter according to claim 1, in which the piston comprises a core of plastics material and a skin of plastics material that is stronger than the core material.

4. A volumetric liquid meter according to claim 1, in which the piston is constituted by a core of plastics material presenting high mechanical strength and a skin of material presenting low density.

5. A liquid meter according to claim 1, in which the piston is constituted by a core of rigid material and a skin of elastomer material.

6. A volumetric liquid meter according to claim 1, in which the piston is constituted by a core of plastics material presenting high mechanical strength and having embedded therein elements of a material presenting low density.

7. A volumetric liquid meter according to claim 6, in which the elements are cylindrical in shape.

8. A volumetric liquid meter according to claim 1, in which the bottom portion comprises a core of plastics material presenting high mechanical strength and at least the surfaces of the skin that come into contact with the piston being made of a material having a low coefficient of friction.

9. A volumetric liquid meter according to claim 8, which the side wall of the bottom portion includes a sealing gasket integrated therein in the form of a projection of elastomer material.

10. A volumetric liquid meter according to claim 1, in which the filter is made of a plastics material presenting high mechanical strength and includes a sealing gasket in the form of a projection of elastomer material.

11. A volumetric liquid meter according to claim 1, in which the top portion is constituted by a core of plastics material presenting high mechanical strength and at least those surfaces of the skin that come into contact with the piston being made of a material having a low coefficient of friction.

* * * * *